J. R. VAN HOESEN.
HEATING DEVICE.
APPLICATION FILED NOV. 25, 1913.
1,101,721. Patented June 30, 1914.
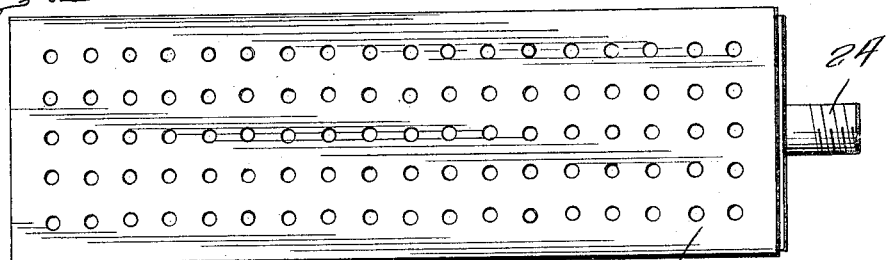
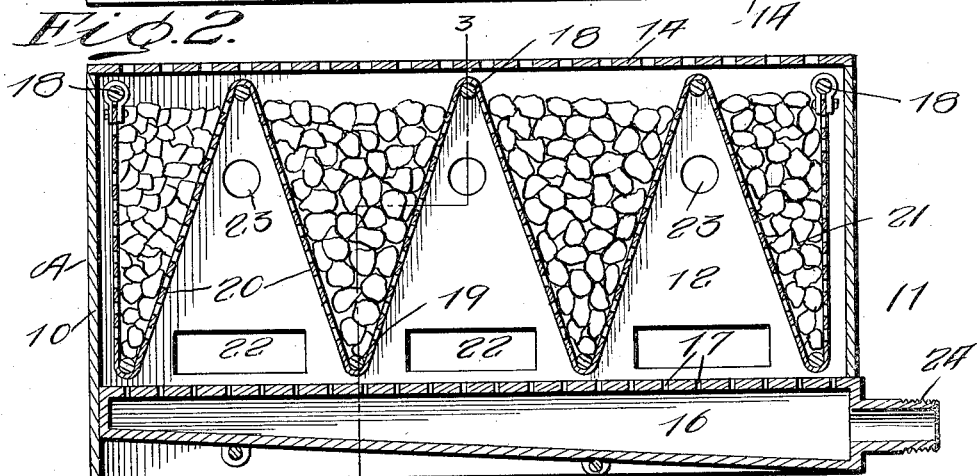
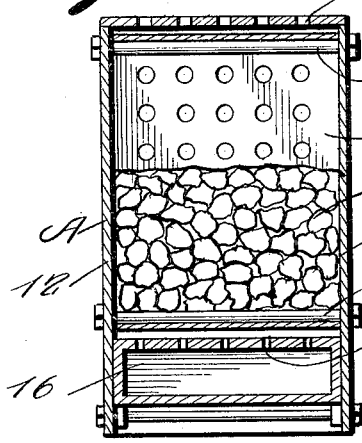
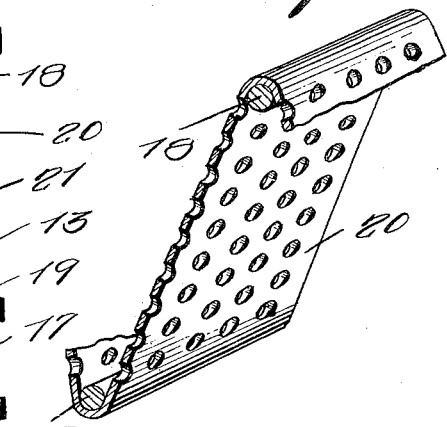
Inventor
J. R. Van Hoesen
Witnesses
Attorneys

UNITED STATES PATENT OFFICE.

JAMES ROMINE VAN HOESEN, OF BROOKLYN, NEW YORK.

HEATING DEVICE.

1,101,721.  Specification of Letters Patent.  Patented June 30, 1914.

Application filed November 25, 1913. Serial No. 802,978.

*To all whom it may concern:*

Be it known that I, JAMES R. VAN HOESEN, a citizen of the United States, residing at Brooklyn, in the county of Kings, State of New York, have invented certain new and useful Improvements in Heating Devices; and I do hereby declare the following to be a full, clear, and exact description of the invention, such as will enable others skilled in the art to which it appertains to make and use the same.

This invention relates to heating devices and particularly to devices of this character adapted to utilize the heat of illuminating gas for heating the rooms of a house or an apartment.

The object of the invention resides in the provision of a device of the character named which will effectively absorb the heat generated by burning illuminating gas and give same off over a relatively large area so as to render same effective for the purpose of warming a room.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of a heating device; Fig. 2, a longitudinal section of same; Fig. 3, a section on the line 3—3 of Fig. 2, and Fig. 4, a fragmental perspective view showing the perforated partition plate employed in the device.

Referring to the drawing the heating device is shown as comprising a casing A which includes end members 10 and 11, side members 12 and 13, and a perforated top member 14. Mounted in the casing A is a burner 16 provided with a plurality of jets 17. Connecting the side members 12 and 13 adjacent the top member 14 is a plurality of bolts 18. Also connecting the side members 12 and 13 just above the burner 16 is a plurality of bolts 19. The interior of the casing A is divided into a plurality of V-shaped compartments by means of a perforated metallic partition plate 20 the terminals of which are secured to respective terminal bolts 18 while the intermediate portion thereof is carried alternately over the bolts 18 and 19. The V-shaped compartments of the casing which converge toward the burner 16 are filled with a suitable heat absorbing material 21. The side member 12 is provided with a plurality of openings 22 through the medium of which access to the jets 17 is had for the purpose of lighting same. The side member 12 is also provided with openings 23 through which products of combustion are adapted to pass to the atmosphere, air being supplied to the burner 16 through the perforations of the open bottom. One end of the burner 16 extends through the end member 11 and is provided with an exteriorly threaded extension 24 whereby the device may be connected to a gas supply pipe.

In the use of the device it will be apparent that the heat of the burner will be absorbed by the material 21 and uniformly given off by the latter over a relatively large area so as to efficiently heat the surrounding atmosphere.

What is claimed is:—

In a device of the class described the combination of a casing, a burner mounted in said casing, a set of bolts connecting the side members of the casing adjacent the top of the latter, a set of bolts connecting the side members of the casing adjacent the burner, a perforate partition plate having its terminals secured to the end bolts of one set and its intermediate portion carried successively around the remainder of said bolts whereby the casing is divided into V-shaped compartments, heat absorbing material disposed in alternate compartments, means for supplying air to the burner, and means for discharging products of combustion to the atmosphere.

In testimony whereof, I affix my signature, in the presence of two witnesses.

JAMES ROMINE VAN HOESEN.

Witnesses:
ANDREW JOHNSON,
CHAS. M. WENDT.

Copies of this patent may be obtained for five cents each, by addressing the "Commissioner of Patents, Washington, D. C."